US007561888B2

(12) United States Patent
Jennings

(10) Patent No.: US 7,561,888 B2
(45) Date of Patent: Jul. 14, 2009

(54) EFFICIENTLY BOUNDING THE LOCATION OF A MOBILE COMMUNICATIONS DEVICE

(75) Inventor: Cullen F. Jennings, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 293 days.

(21) Appl. No.: 11/182,548

(22) Filed: Jul. 15, 2005

(65) Prior Publication Data

US 2007/0015489 A1    Jan. 18, 2007

(51) Int. Cl.
*H04W 24/00*     (2006.01)
*H04M 11/04*     (2006.01)
*G01C 21/00*     (2006.01)
*G01S 5/14*      (2006.01)
*G01S 1/00*      (2006.01)

(52) U.S. Cl. .............. 455/456.2; 455/404.2; 455/456.1; 701/200; 342/357.08; 342/357.1

(58) Field of Classification Search ... 455/456.1–456.6; 704/45; 340/539.11, 539.21, 573.4
See application file for complete search history.

(56) References Cited

U.S. PATENT DOCUMENTS

| | | | |
|---|---|---|---|
| 6,868,410 B2 * | 3/2005 | Fortin et al. ................... 706/45 |
| 7,095,319 B2 * | 8/2006 | Izumi et al. ............ 340/539.11 |
| 7,245,923 B2 * | 7/2007 | Frank et al. .............. 455/456.1 |
| 7,366,516 B1 * | 4/2008 | Oh et al. ..................... 455/445 |
| 2002/0059226 A1 * | 5/2002 | Cooper ........................... 707/6 |
| 2002/0184236 A1 * | 12/2002 | Donath et al. ............. 707/104.1 |
| 2002/0188581 A1 | 12/2002 | Fortin et al. |
| 2006/0271582 A1 * | 11/2006 | Collins ........................ 707/102 |
| 2007/0132639 A1 * | 6/2007 | Korneluk et al. ............. 342/464 |
| 2008/0113673 A1 * | 5/2008 | Brown et al. ............. 455/456.1 |

OTHER PUBLICATIONS

Rosen, B., "Emergency Call Information in the Domain Name System", Sipping, Internet-Draft, Jul. 16, 2004, (expires Jan. 14, 2005), pp. 1-20.
Rosen, B. et al., "NENA Requirements for Emergency Call Processing", Ecrit, Internet-Draft, Feb. 15, 2005, (expires Aug. 19, 2005), pp. 1-14.
Handley, M., et al., "SIP: Session Initiation Protocol," Network Working Group, Mar. 1999, pp. 1-153.
Krawczyk, H., et al., "HMAC: Keyed-Hashing for Message Authentication," Network Working Group, Feb. 1997, pp. 1-11.

(Continued)

*Primary Examiner*—George Eng
*Assistant Examiner*—Un C Cho
(74) *Attorney, Agent, or Firm*—Tucker Ellis & West LLP

(57) ABSTRACT

A system and methods enable a mobile communications device to determine the Public Safety Answering Point (PSAP) that serves the device, without disclosing the device's exact location. The device makes a query to its service provider that includes a bounded description of the device's location. The mobile device receives a first set of "edges" corresponding to a set of polygons defined on the earth's service. The mobile device then determines which of the received polygons it is included within by extending an imaginary latitudinal line through the polygon's edges and counting the number of intersections.

12 Claims, 4 Drawing Sheets

OTHER PUBLICATIONS

Rosenberg, J., "Obtaining and Using Globally Routable User Agent (UA) URIs (GRUU) in the Session Initiation Protocol (SIP)," SIPP, Internet-Draft, Oct. 20, 2005, pp. 1-41.
Rosenberg, J., "Request Authorization through Dialog Identification in the Session Initiation Protocol (SIP)," SIPP, Internet-Draft, Apr. 4, 2005, pp. 1-15.
Rosenberg, J., et al., "SIP: Session Initiation Protocol," Network Working Group, Jun. 2002, pp. 1-269.
Schulzrinne, H., "Emergency Calling for VoIP," Columbia University, Jan. 2004, pp. 1-6.
Schulzrinne, H., "Enterprise SIP," Avaya, Columbia Computer Science, Mar. 29, 2001, pp. 1-10.
Schulzrinne, H., et al., "Policy Rules for Disclosure and Modification of Geographic Information," GEOPRIV, Internet-Draft, Oct. 20, 2003, pp. 1-41.
Willis, D., et al., "SIP Cookies," SIP, Internet-Draft, Jul. 2001, pp. 1-9.
Cheng, R., et al., "Using Uncertainty to Provide Privacy-Preserving and High-Quality Location-Based Services," Workshop on Location Systems Privacy and Control, Mobile HCI 04, 2004, 4 pages, [online] [retrieved on Nov. 14, 2006] Retrieved from the Internet: <URL: http://www.cs.purdue.edu/homes/sunil/frames/pub/privacy.pdf>.
International Search Report and Written Opinion, PCT/US2006/025219, Nov. 27, 2006, 12 pages.

* cited by examiner

500

| Polygon | Edges |
|---------|-------|
| 1 | — |
| 2 | — |
| ⋮ | ⋮ |
| ⋮ | ⋮ |
| N | — |

EFFICIENTLY BOUNDING THE LOCATION OF A MOBILE COMMUNICATIONS DEVICE

FIELD OF THE INVENTION

The present invention relates to mobile communications devices, and more particularly, to an efficient method of bounding the location of a mobile communications device on the earth's surface, without requiring the device to transmit its location.

BACKGROUND OF THE INVENTION

When a public mobile communications device such as a cell phone places a 911 or other emergency call, a facility known as a Public Safety Answering Point, or PSAP, responds to the call. The PSAP determine the nature of the emergency and engages the appropriate local public safety service, e.g., police, fire etc. Each PSAP serves a geographic area defined by a polygon on the earth's surface, and a state or province may include many PSAPs. Thus, when an emergency call is placed by a mobile user, the appropriate PSAP must be quickly determined so that the necessary emergency services may be timely called to action.

The mobile communications device may know its current location from the network that services it, from a radio navigation service such as GPS, or by other means. The mobile device could simply transmit its location to its service provider, and request the provider to determine the appropriate PSAP. In some scenarios, however, it may be undesirable or hazardous for the mobile device to reveal its exact location to unauthorized or untrusted parties during an emergency call. For example, it may be undesirable for a military person making a medical emergency phone call during combat to disclose location information to network servers accessible by hostile parties.

Alternatively, the mobile device could determine what PSAP serves its current location by determining which polygon it is in when the call is placed. This can readily be done when the mobile device remains within or near its normal operation location. For example, by recognizing the cell tower in use, the service provider (SP) knows that the mobile device is within the corresponding cell boundary, and may be able to determine a corresponding polygon and PSAP. Consider, however, a scenario wherein the mobile device is registered to an SP in, e.g., England, and the device is currently served by a network somewhere in the United States, e.g., in San Jose, Calif. It is unlikely that the home SP in England will know the polygon structure for California.

The National Emergency Numbering Association (NENA) and the Internet Emergency Task Force (IETF) are studying the use of Domain Name Servers (DNS) to allow mobile devices to learn PSAP polygons. The mobile device sends a DNS query, and a complete set of hierarchical polygon information is sent to the mobile device. Such information may include polygons for many or all countries in the world. A complete definition of the structure of all of these polygons must be downloaded to the mobile device. The mobile device first determines which of the largest polygons it is in, which might correspond to determining the country. The mobile device then retrieves polygon information regarding all the states or provinces within the country, and determines which state or province it is in. The process is repeated to the county and finally to the PSAP level, after which the mobile device finally contacts the appropriate PSAP. As may be appreciated, considerable information must be transferred. Since polygons may have many vertices, and since the transmission speed may be relatively low, an inordinate amount of time may be required to transfer the necessary information. Meanwhile, experience has shown that if an emergency call does not go through within several seconds, the user will often abandon the call and try again.

From the above, there is a need for an improved system and method to enable a mobile communication device making an emergency call to efficiently determine the appropriate PSAP, without divulging detailed location information.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF PREFERRED EMBODIMENTS

The present invention includes a system and a method that enables a mobile communications device to determine the PSAP that services the device, without disclosing the device's detailed location. The mobile device first determines its location via the Global Positioning System (GPS), or other appropriate service. The device then makes a query to its service provider, to one or more PSAPs directly, or to some other server/database. The query includes a bounded description of the device's location, for example, including latitude and longitude ranges. Optionally, the device may simply provide a latitude or equivalent range alone. The specified range is sufficiently broad to make locating the mobile device impractical.

According to one embodiment, the mobile device receives a first set of "edges," corresponding to a set of non-overlapping polygons defined on the earth's surface. The polygons each have at least one vertex within the specified location range. Alternately, a set of vertices that define the edges could be specified. The mobile device may then determine whether or not it is included within a given polygon by extending an imaginary latitudinal line through the polygon's edges and counting the number of intersections. If the number of intersections is odd, the device is included within the polygon. Conversely, if an even number of intersections is found, the device is not included within the polygon.

In some embodiments, the mobile device next returns the identity of the first including polygon to the server, and requests a new set of polygons and edges that are included within the first polygon. The process is repeated until the PSAP is determined. Advantageously, the mobile device only needs to receive a limited subset of the vertices, and the mobile device need not to reveal its location in detail.

Reference will now be made in detail to several embodiments of the present invention, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
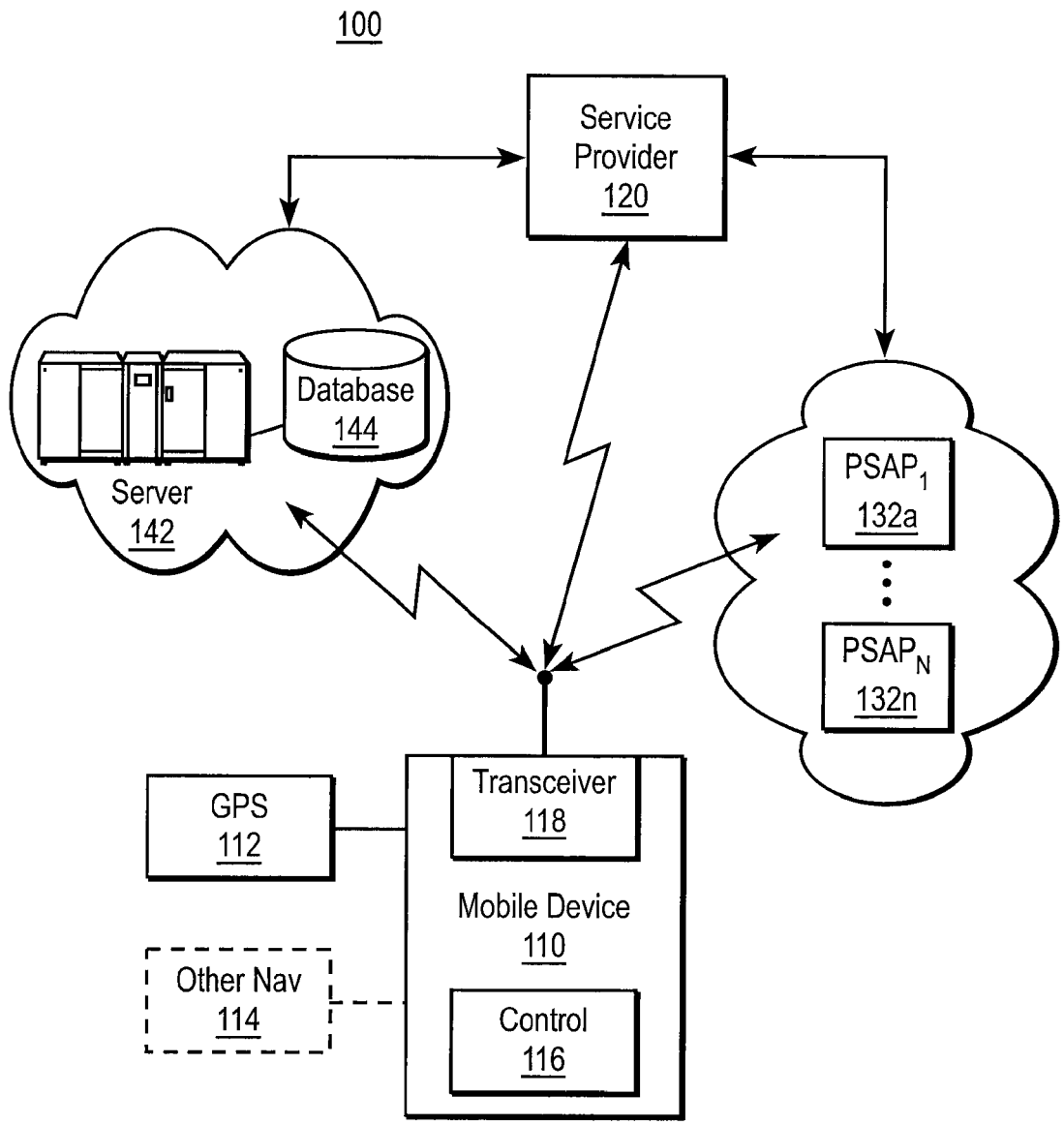
FIG. 1 is a schematic illustration of a mobile communications system.

FIG. 1 is a schematic illustration of a mobile communication system 100. A mobile communications device 110 communicates wirelessly with a service provider 120 by means of an associated network infrastructure. Device 110 may be, e.g., a cellular handset, a personal digital assistant (PDA) or other device. Communication may take place according to any of number of protocols, including second-generation cellular ("2G"), 3G, voice-over-internet protocol (VOIP), or various appropriate schemes. Mobile device 110 and service provider 120 may exchange information corresponding to a number of applications, including, e.g., voice, text messaging, still and motion pictures, and so on.

Mobile communications device 110 also receives information regarding its current location from service provider 120 and/or an associated navigation device, such as a global positioning system device 112 or other appropriate device 114. Devices 112 or 114 may be physically included within communications device 110 or may be physically separate. The navigation method may be an autonomous, server-assisted, or may use another appropriate technique. Mobile device 110 includes control functionality 116, which may be implemented according to any of a variety of techniques that are well-known in the art. Such techniques include software-, firmware- or hardware-based techniques, or combinations thereof.

Mobile communications device 110 also includes a transceiver module or functionality 118, e.g., a transmitter and receiver. The transmitter is configured to transmit information to service provider 120 based on the applications of interest via an appropriate wireless communications channel. Similarly, the receiver is configured to receive information transmitted by service provider 120. Operation of transceiver 118 may be orchestrated by control functionality 116. In at least one embodiment, control functionality 116 and transceiver functionality 118 operate to determine whether communications device 110 is located within a particular polygon.

Service provider 120 provides communications among, for example, mobile users, the public switched telephone network (PSTN), the Internet and other types of networks and communications service providers. In addition, service provider 120 may communicate with one or more PSAPs 132. The PSAPs collectively accommodate the mobile service provision area, and dispatch emergency calls (e.g., 911) made by mobile users to the appropriate public safety authorities. Mobile device 110 may alternately access information via a server 142 and database 144 that contains, e.g., polygon information. This may be done either directly, or through service provider 120, based on control functionality 116 and transceiver 118.

Figure 2:
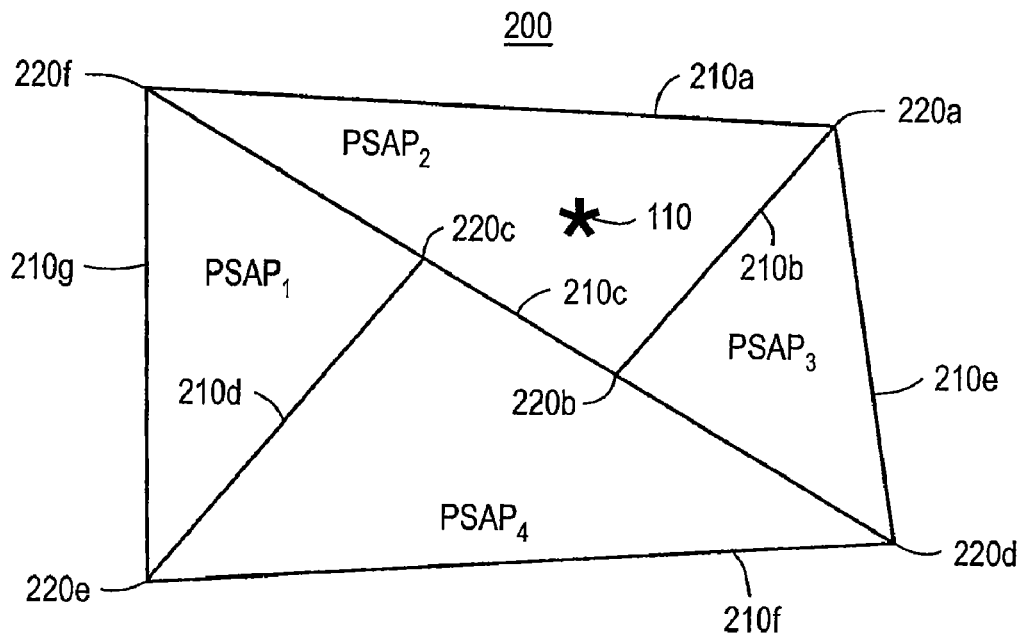
FIG. 2 illustrates the topology of a multiplicity of Public Safety Answering Points (PSAPs).

As shown in the exemplary scenario of FIG. 2, each PSAP serves a geographic region that is bounded by a set of lines, or "edges" 210 and corresponding vertices 220. The geographic areas covered by the PSAPs are contiguous and non-overlapping. In FIG. 2, mobile device 110 is included within $PSAP_2$.

Figure 4:
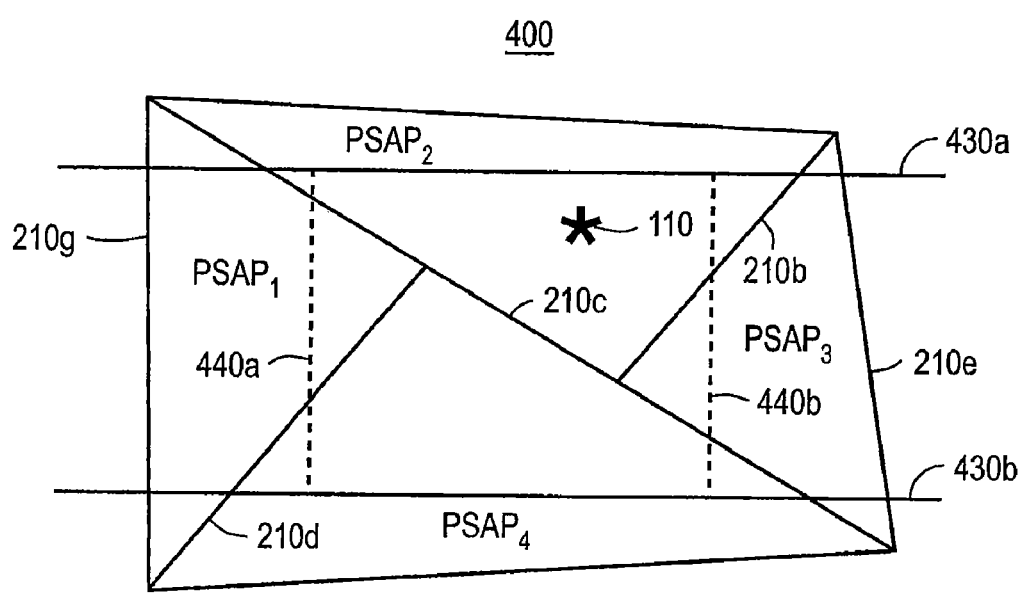
FIG. 4 illustrates the concept of location range.
Figure 3:
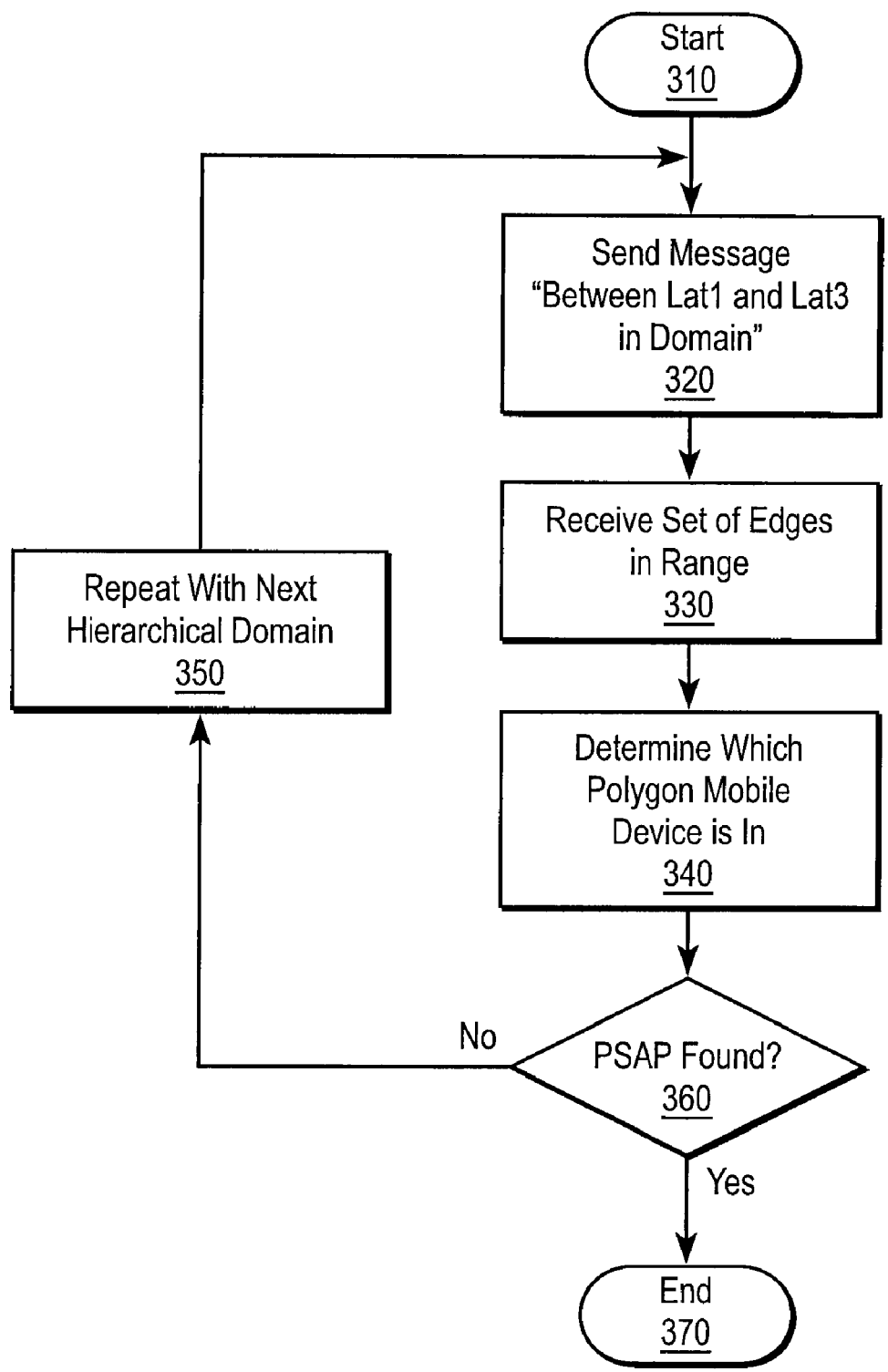
FIG. 3 is a flowchart according to one embodiment of the method of the present invention.

Referring to FIG. 3, when the user places an emergency call, mobile device 110 preferably transmits a message 320 to service provider 120 or server 142 stating that its location is bounded by a specified range of latitude or other equivalent information. Optionally, service provider 120 may redirect the message to server 142. Mobile device 110 may also transmit a bounding range of longitude or equivalent information. If no longitude range is specified, it is assumed that the longitude range does not exceed 180 degrees, i.e., halfway around the earth's surface. Alternately, latitude and longitude may be implicitly bounded according to the overall coverage area of service provider 120. The specified ranges transmitted by mobile communications device 110 are sufficiently broad that it would be difficult for the receiving party to physically locate mobile device 110. The specified latitude and longitude ranges are represented in FIG. 4 by lines 430a-b and 440a-b, respectively.

According to one embodiment, latitude and optionally longitude ranges are each specified in terms of a value and range relative to the value, e.g., 20 degrees north latitude plus and minus one degree. It will be appreciated that many other ways of specifying the location range can be applied.

According to another embodiment, the boundaries of the location range are specified so that the center of the range varies randomly with respect to the actual location of mobile device 110. Consequently, parties intercepting the specified range will not be able to easily determine the actual location of mobile device 110.

According to yet another embodiment, the location range is initially set equal to or greater than the overall service area of service provider 120.

Figures 5, 6:
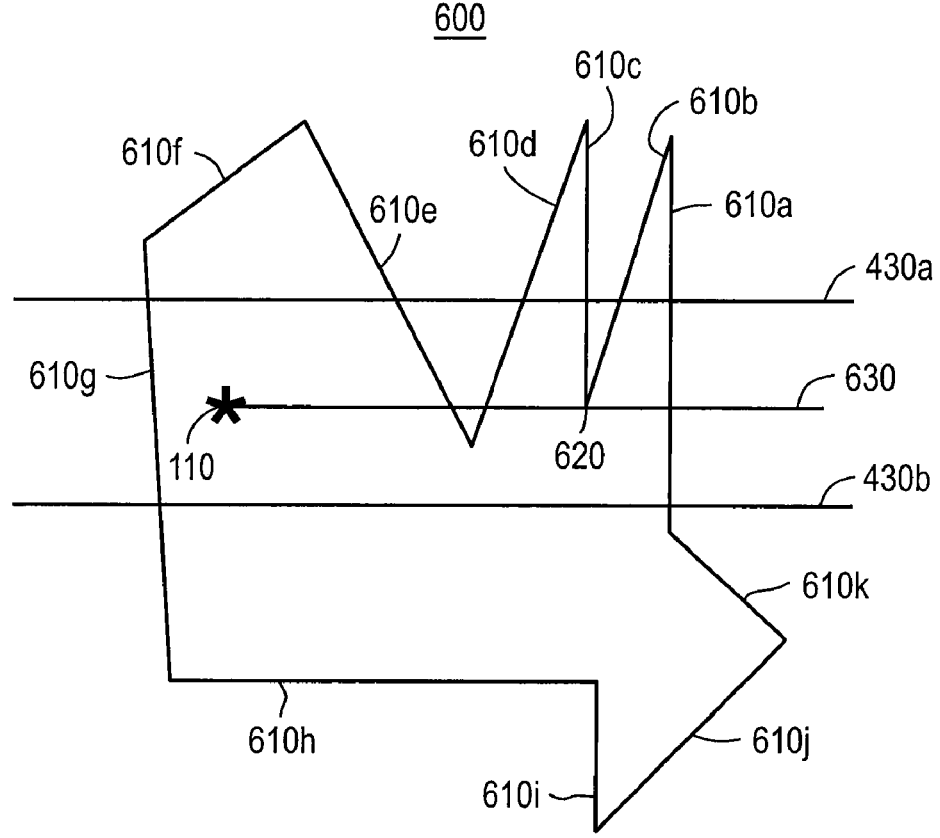
FIG. 5 illustrates tabulation of polygons and their edges.
FIG. 6 illustrates a method of determining inclusion within a polygon.

In response to message 320, service provider 120 or server 142 returns 330 a number of edge sets to mobile device 110. Each edge set corresponds to a particular polygon, as shown in FIG. 5. The polygons initially received may correspond to individual PSAPs, or to multiple PSAPs. In other words, the polygons may comprise multiple PSAPs according to a hierarchy. Furthermore, certain edges may be common to two polygons. Only edges that traverse the latitude and, optionally, longitude ranges specified by mobile device 110 need be communicated. For example, according to the scenario of FIG. 4, only edges 210b, c and d need be communicated; optionally, lines 210e and 210g may be transmitted if no longitude range is specified.

Mobile device 110 next determines 340 which of the received polygons it is included within. FIG. 6 shows an outline of a PSAP, as defined by edges 610. Mobile device 110 extends a line 630 in one direction (e.g., east or west) within the latitude range it specified in step 320, and within the longitude range that includes all polygons received. Step 340 then counts the number of intersections of line 630 with the supplied edges of a given polygon. If the number of intersections is odd, then mobile device 110 is included within the polygon. Conversely, if the number of intersections is even, then mobile device 110 is not included within the polygon. If line 630 intersects with a vertex, as shown at 620, the intersection is counted as zero or an even number of effective intersections.

If the polygon thus found corresponds to a PSAP, then the method terminates 370. Otherwise, steps 320, 330 and 340 are repeated for polygons of successively lower hierarchical order until the PSAP including mobile device 110 is determined. Some embodiments do not receive hierarchical polygons, and thus do not perform the actions of FIG. 3 more than once.

Once the including PSAP is determined, an emergency call made by mobile device 110 may be routed to the PSAP via service provider 120, or directly to the PSAP, as shown in FIG. 1. The PSAP then contacts the appropriate public service authority, which responds as necessary.

Advantages of the present invention include an efficient means of bounding the location of a mobile communications device to a PSAP region. Furthermore, the mobile device need not reveal its precise location to the supporting network. This is highly desirable in situations where the mobile user must keep location confidential.

Through the disclosed principles of the present invention, those of skill in the art will appreciate still additional alternative structural and functional designs for a system and method for bounding the location of a mobile communications device. Thus, while particular embodiments and applications of the present invention have been illustrated and described, it is to be understood that the invention is not limited to the precise construction and components disclosed herein. Moreover, it should be noted that the language used in the specification has been principally selected for readability and instructional purposes, and may not have been selected to delineate or circumscribe the inventive subject matter. Various modifications and variations which will be apparent to those skilled in the art may be made in the arrangement, operation and details of the method and apparatus of the present invention without departing from the spirit and scope of the invention as defined in the appended claims.

What is claimed is:

1. A method for bounding a location of a mobile communications device, the method comprising:

transmitting a query to a server, the query including a location range encompassing the location of the mobile communication device and being sufficiently broad to make locating the mobile communication device impractical, wherein the location range is comprised of one of a first latitude and a second latitude, a first latitude and a latitude range, a first longitude and a second longitude, or a first longitude and a longitude range such that a detailed location of the mobile communication device is not disclosed;

receiving from the server a group of polygons defined on the earth's surface that traverse the location range; and determining a first polygon in the group of polygons that includes the mobile communications device, the first polygon having edges;

wherein said determining a first polygon comprises extending a latitudinal line in one direction over a longitude not exceeding a predetermined range, counting a number of intersections of the latitudinal line with the edges of the first polygon, and determining that the first polygon contains the mobile communications device when the number of intersections is odd.

2. The method of claim 1, further comprising repeating said transmitting, receiving and determining according to a next group of polygons defined on the earth's surface and included within the first polygon and traversing the location range.

3. The method of claim 1, wherein the location of the mobile communications device is determined by a radio navigation device.

4. The method of claim 1, wherein the location range is determined by the mobile communications device according to a service area plan.

5. The method of claim 1, wherein the polygons comprise edge sets, each edge set comprising a plurality of edges, wherein each edge represents a side of a polygon, and at least one edge of each edge set traverses the location range.

6. The method of claim 1, wherein the polygons comprise vertices defining a set of edges, wherein each edge represents a side of a polygon, and at least one edge of each edge set traverses the location range.

7. The method of claim 1, wherein the predetermined range is consistent with the location range.

8. An apparatus for bounding a location of a mobile communications device, the apparatus comprising:

a transmitter module, configured to transmit a query to a server, the query including a location range encompassing the location of the mobile communication device and being sufficiently broad to make locating the mobile communication device by the server impractical, wherein the location range is comprised of one of a first latitude and a second latitude, a first latitude and a latitude range, a first longitude and a second longitude, or a first longitude and a longitude range such that a detailed location of the mobile communication device is not disclosed;

a receiver module, configured to receive from the server a group of polygons defined on the earth's surface that traverse the location range; and a control module, configured to determine a first polygon in the group of polygons that includes the mobile communications device, the first polygon having edges;

wherein said determining a first polygon comprises extending a latitudinal line in one direction over a longitude not exceeding a predetermined range, counting a number of intersections of the latitudinal line with the edges of the first polygon, and determining that the first polygon contains the mobile communications device when the number of intersections is odd.

9. The apparatus of claim 8, wherein said transmitting, receiving and control modules repeat the transmitting, receiving and determining functions for a next group of polygons defined on the earth's surface and included within the first polygon and traversing the location range.

10. The apparatus of claim 8, wherein the polygons comprise edge sets, each edge set comprising a plurality of edges, wherein each edge represents a side of a polygon, and at least one edge of each edge set traverses the location range.

11. The apparatus of claim 8, wherein the polygons comprise vertices defining a set of edges, wherein each edge represents a side of a polygon, and at least one edge of each edge set traverses the location range.

12. An apparatus for bounding a location of a mobile communications device, the apparatus comprising:

means for transmitting a query to a server, the query including a location range encompassing the location of the mobile communication device and being sufficiently broad to make locating the mobile communication by the server difficult, wherein the location range is comprised of one of a first latitude and a second latitude, a first latitude and a latitude range, a first longitude and a second longitude, or a first longitude and a longitude range such that a detailed location of the mobile communication device is not disclosed;

means for receiving from the server a group of polygons defined on the earth's surface that traverse the location range; and means for determining a first polygon in the group of polygons that includes the mobile communications device, the first polygon having edges;

wherein said means for wherein said determining a first polygon comprises means for extending a latitudinal line in one direction over a longitude not exceeding a predetermined range, means for counting a number of intersections of the latitudinal line with the edges of the first polygon, and means for determining that the first polygon contains the mobile communications device when the number of intersections is odd.

* * * * *